United States Patent [19]

Kress

[11] 3,990,763

[45] Nov. 9, 1976

[54] TELEPHONE CABLE ADAPTER

[76] Inventor: Robert N. Kress, 207 Walter St., Pittsburgh, Pa. 15210

[22] Filed: Sept. 3, 1974

[21] Appl. No.: 502,557

[52] U.S. Cl. .......................... 339/155 R; 179/1 PC; 339/156 R
[51] Int. Cl.² ........................................ H01R 27/00
[58] Field of Search ............... 339/151 M, 153, 154, 339/163, 164 M, 166, 157 R, 157 C, 159 C, 155, 156; 179/1 PC, 98

[56] References Cited
UNITED STATES PATENTS

| | | | |
|---|---|---|---|
| 2,654,074 | 9/1953 | Lancelot ...................... | 339/164 M |
| 2,912,625 | 11/1959 | Benson ........................ | 339/193 VS |
| 3,364,458 | 1/1968 | Black, Jr. et al. ............. | 339/154 A |
| 3,671,918 | 6/1972 | Mitchell ....................... | 339/176 M |

Primary Examiner—Roy Lake
Assistant Examiner—Neil Abrams
Attorney, Agent, or Firm—Reed Smith Shaw & McClay

[57] ABSTRACT

A telephone cable adapter is provided to distribute and translate the conductor pairs of a telephone cable to electrically connect and translate the color code to a noncorresponding multi-plug telephone set. The adapter has a plurality of male plugs adapted for connection to corresponding connectors of the telephone cable; and a plurality of female connectors, different in number from the male plugs, adapted for connection to corresponding plugs of the telephone set. The pins of the male plugs are electrically connected to sockets of the female connectors by conductors, such as wires or printed circuit pathways, to direct and translate conductor pairs of the cable to the connectors and color code of the telephone set.

4 Claims, 7 Drawing Figures

TELEPHONE CABLE ADAPTER

FIELD OF THE INVENTION

The present invention relates to a telephone cable adapter for connecting a telephone set to a dissimilar telephone cable.

BACKGROUND OF THE INVENTION

Telephone cable adapters are old and well known. Telephone cable adapters are provided that divide conductors of a telephone cable into two branches for two telephones. Telephone cable-color code adapters are also provided that adapt and connect conductors of a telephone cable to conductors of another telephone cable or telephone set having the same number of conductor groups and connectors. It has not, however, been suggested that cable adapters could be provided to readily connect multi-connector telephone cables to non-corresponding multi-plug telephone sets. To the contrary, it has been the practice to wholly change the telephone cable system to utilize a new telephone set dissimilar from the old set.

In a telephone cable the conductors are paired and color coded to provide for wiring to the telephone system. Utilized are 10 different colors of wire insulation each with the same 10 colors as tracers on the insulation. The colors are blue (BL), orange (O), green (G), brown (BR), slate (S), white (W), red (R), black (BK), yellow (Y), and violet (V). This permits for 25 of pairs of conductors in the color code. These 25 pairs of typically terminated at sockets of a single female connector. In a telephone cable containing more than 25 pairs of conductors, the conductors are divided into groups typically of 20 or 25 pairs and terminated at more than one connector. Each group contains the same color code and has a colored string called a binder spiraled about the group. The colors of the binders of the differing groups of each cable follow the same color code as that of the conductor pairs. For example, a telephone cable of 75 pairs of conductors has blue (BL), orange (O), and green (G) binders. The same color code is used on the conductor pairs of the telephone cord, and the conductor pairs are terminated at pins of male plugs corresponding to the female connectors of the cable. In this way, the conductors of the cable can be readily connected by the service personnel to the proper terminals of the telephone set.

The problem is that different telephone sets correspond to different multi-group, multi-connector cables. For example, an 18-button telephone set is equipped with three 50-pin plugs and is used with a three-group, three-connector 75-pair telephone cable, while a 30-button Call-Director™ telephone set is equipped with five 50-pin plugs and is used with a five-group, five-connector 100-pair telephone cable. Therefore, if a telephone system is up-graded from the 18-button telephone set to the larger 30-button telephone set, it has been common practice to replace the 75-pair cable with a 100-pair cable. Generally, the 75-pair cable is wasted. Moreover, the placing and routing of telephone cables between the relay equipment and the telephone is the major time and expense in installing a telephone service. The routing of the cable can be either by conduit, overhead, floor duct or exposed fastener. Thus, the changing of a telephone cable system can be a larger and more expensive project than installation of the original service.

The present invention overcomes this difficulty and disadvantage of telephone installation. It provides a telephone cable adapter that automatically directs, distributes and translates conductor pairs of a telephone cable to the plugs and color code of a dissimilar multi-plug telephone set.

SUMMARY OF THE INVENTION

A telephone adapter is provided which can readily electrically adapt and translate the color code of a telephone cable to a non-corresponding multi-plug telephone set. The adapter comprises a plurality of male plugs, and a plurality of female connectors different in number from the male plugs.

Each plug has a plurality of pairs of pins, preferably 25 in number, adapted for connection to pairs of sockets of a corresponding connector of a telephone cable. And each connector has a plurality of pairs of sockets, preferably 25 in number, adapted for connection to pairs of pins of a corresponding plug of a telephone set.

The pins of the male plugs are electrically connected by conductors, such as wires or printed circuit conductive pathway, to sockets of the female connectors. The conductors are thus arranged and connected between the plugs and connectors to direct, translate and distribute the conductor pairs of the telephone cable to the dissimilar plugs and color code of the telephone set.

Other details, objects and advantages of the invention will become apparent as the following description of the preferred embodiment and the presently preferred methods of practicing the same proceeds.

BRIEF DESCRIPTION OF THE DRAWINGS

In the accompanying drawings, the preferred embodiments of the invention and the presently preferred methods of practicing the invention are illustrated, in which.

DESCRIPTION OF THE PREFERRED EMBODIMENTS

An embodiment of the invention is shown which is utilized particularly to adapt a three-group, three-connector, 75-pair telephone cable for connection to a five-plug, 30-button Call-Director™ telephone. The adapter involves utilization of three male plugs each having 25 pairs of pins, and five female connectors each having at least 20 and preferably 25 pairs of sockets. This embodiment is a particularly useful form of the invention; the invention may, however, be otherwise variously embodied and used.

Figure 1:
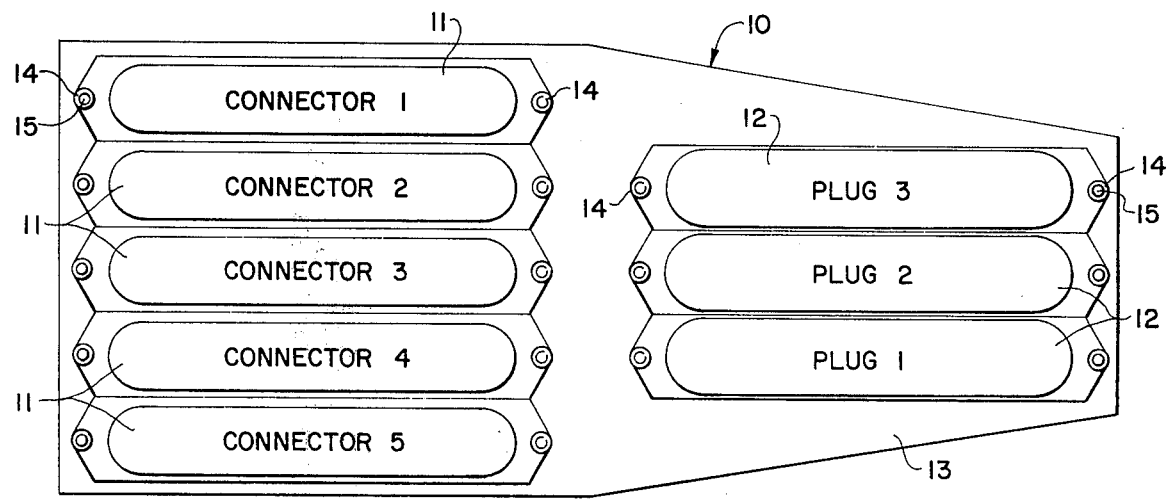
FIG. 1 is a top view of a telephone cable adapter in accordance with the present invention.
Figure 2:
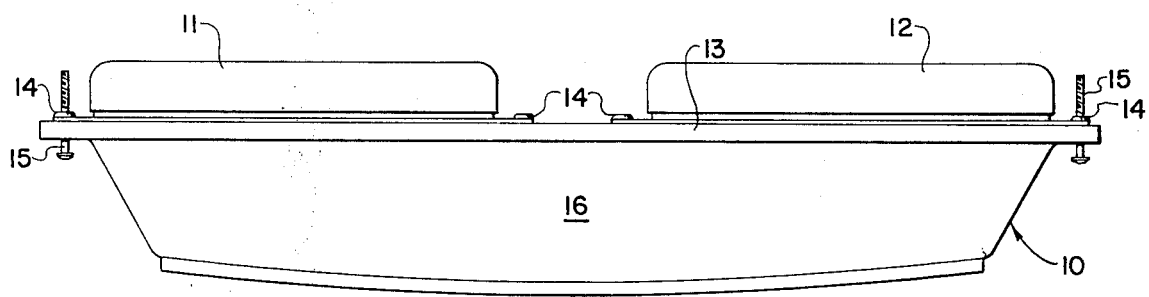
FIG. 2 is a side elevational view of the telephone cable adapter shown in FIG. 1.

Referring specifically to FIGS. 1 and 2, telephone cable adapter 10 is comprised of five female connectors 11 and three male plugs 12. Connectors 11 and plugs 12 are arranged in spaced parallel relation as shown on FIG. 1, and fastened to mounting plate 13 of acrylic plastic or other suitable rigid electrically insulating material. Connectors 11 and plugs 12 are fastened to mounting plate 13 by open rivets 14, adhesive or any other suitable means, and screws 15 are threaded through openings in plate 13 and rivets 14 at the edges of the plate to provide for fastening of connectors of the cable and plugs of the telephone cord to the adapter.

Through mounting plate 13 are openings (not shown) to provide for electrical connection of connectors 11 with plugs 12 as hereinafter described. The assembly also preferably includes housing 16, most desirably fastened to mounting plate 13 by an adhesive, to enclose and support the electrical connections between connectors 11 and plugs 12.

Figure 3:
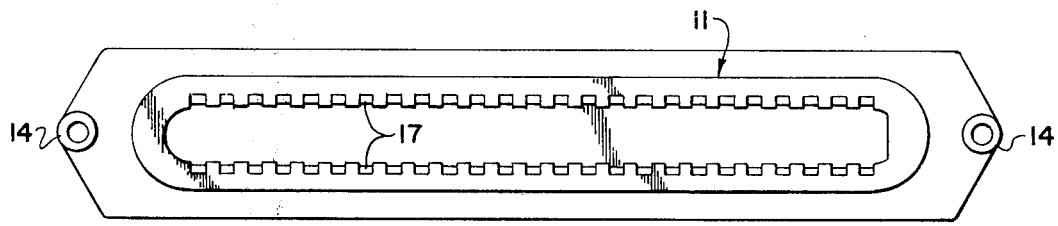
FIG. 3 is a top view of one of the connectors of the adapter shown in FIG. 1 with the dust cover removed.

Referring to FIG. 3, each female connector 11 preferably has two spaced apart rows of sockets 17 in 25 pairs. Each pair of sockets 17 is adapted for connection to pairs of pins of a corresponding male plug of a telephone set cord, and are color coded suitable for that correspondence.

Figure 4:
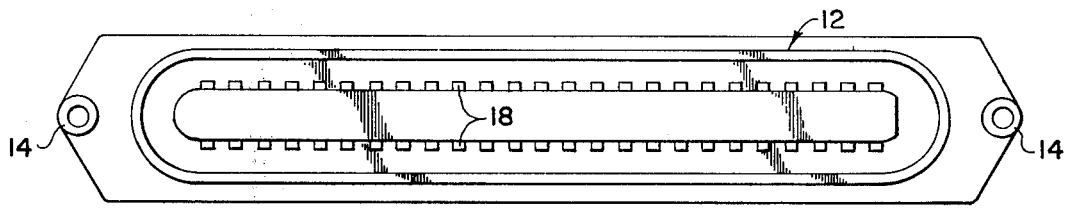
FIG. 4 is a top view of one of the plugs of the adapter shown in FIG. 1 with the dust cover removed.

Referring to FIG. 4, each male plug 12 has two spaced apart rows of pins 18 in 25 pairs. Each pair of pins 18 is adapted for connection to a corresponding pair of sockets of a connector of a telephone cable and is color coded suitable for that correspondence.

Each pin 18 of each male plug 12 is electrically connected to a socket 17 of a female connector 11 by suitable wires or other electrical conductor such as printed circuit conductive pathway. The conductor pairs of the telephone cable are thus directed and translated to the conductor pairs of a telephone set having a different number of plugs and color code of the conductors of the cord from the connectors and color code of conductors in the telephone cable.

Figure 5A:
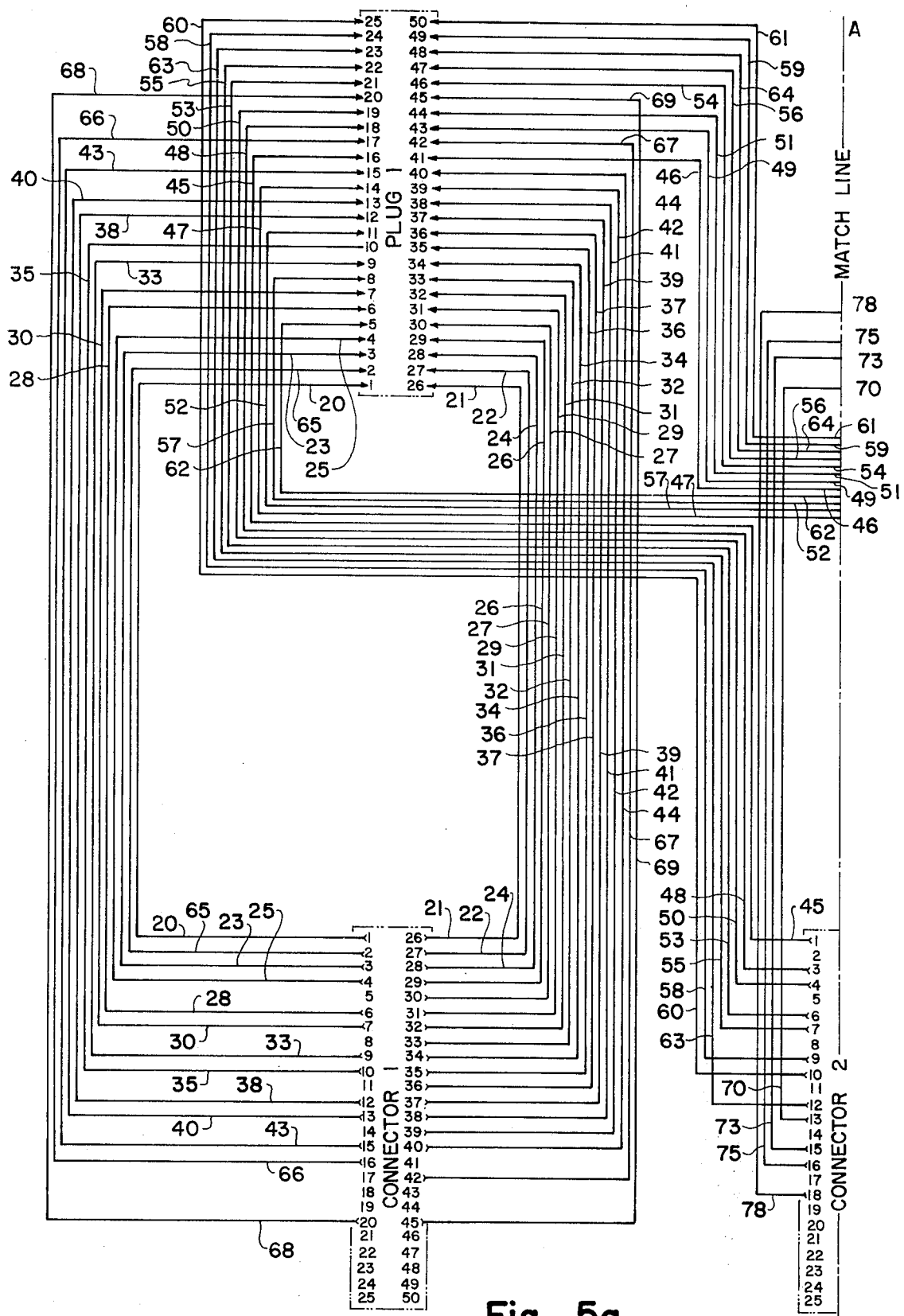
FIGS. 5A–5C are circuit schematics illustrating the connections within the telephone adapter shown in FIG. 1.
Figure 5B:
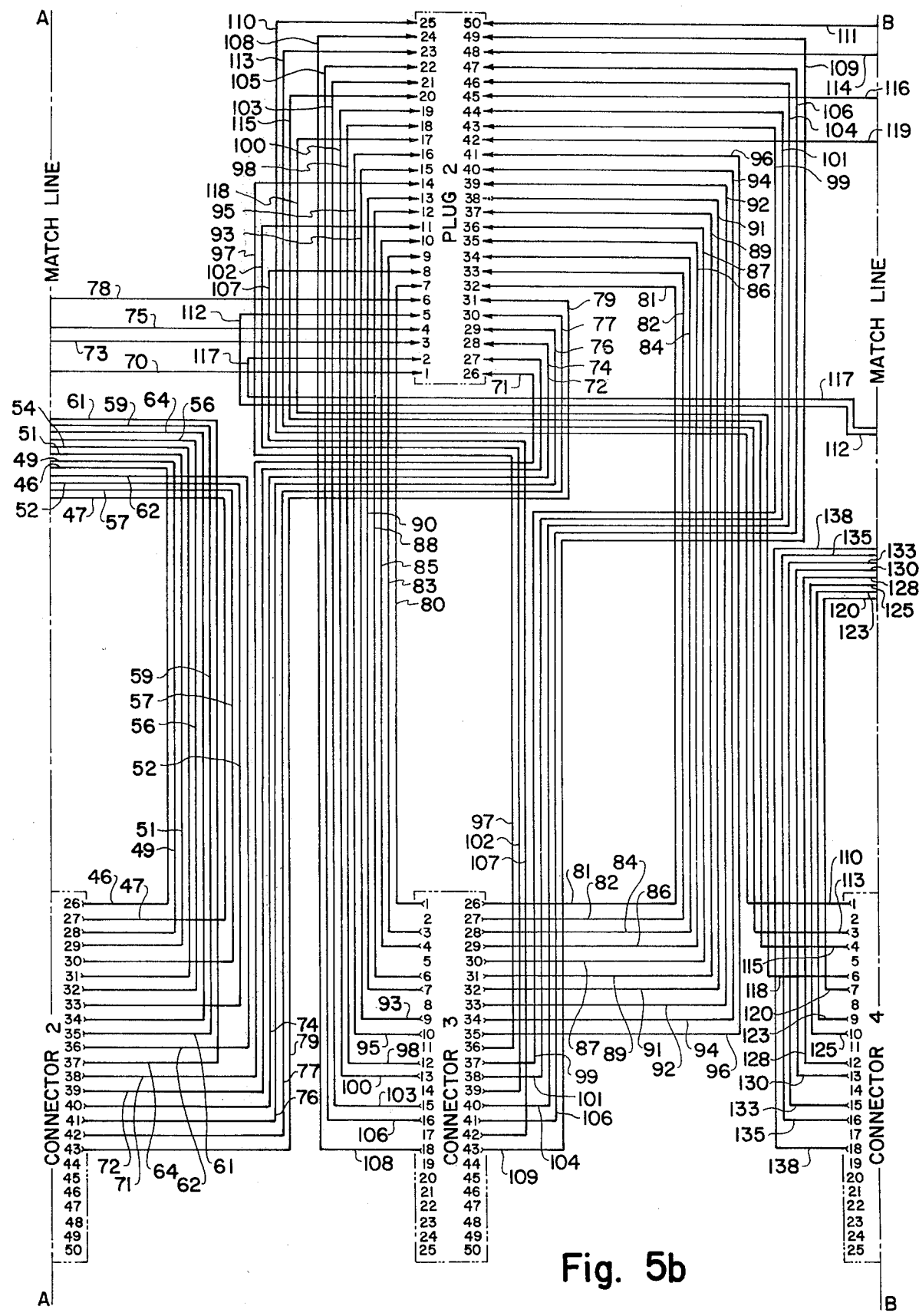
Figure 5C:
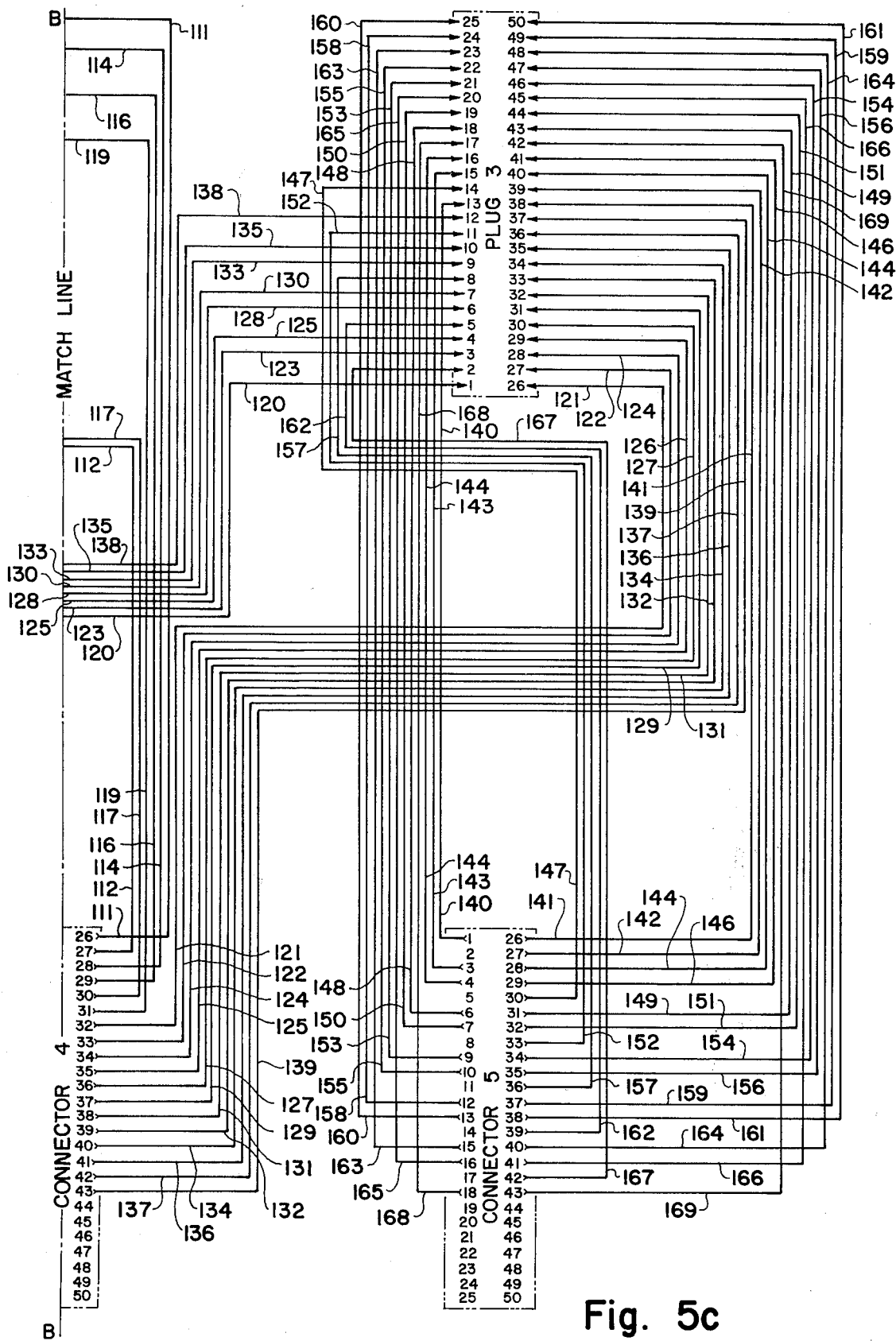

Referring to FIGS. 5A–5C the direction and translation of the conductors is shown. Each telephone line (or button) of the telephone set requires five conductors to completely activated and control the line: Ring R and Tip T that provide the talk path, Lead A that controls the "A" relay, and Lamp L and Lamp Ground LG that energize and control the lamp associated with the particular button and line. And the hold button requires only conductor $A_1$ ground, and the ringer requires only two conductors R and B to operate. The specific direction and translation of said conductor pairs is described in tabular form in Table I below:

TABLE I

| | RELAY EQUIP. | | 75-PAIR TELEPHONE CABLE | | | | | | ADAPTER | | | | |
|---|---|---|---|---|---|---|---|---|---|---|---|---|---|
| Ref. No. of Wire | Line | Lead Designation | Binder Color | Wire Color | Tracer Color | Connector No. | Socket No. | Pin No. | Plug No. | Wire Color | Tracer Color | Connector No. | Socket No. |
| 20 | 1 | R | BL | BL | W | 1 | 1 | 1 | 1 | BL | W | 1 | 1 |
| 21 | 1 | T | BL | W | BL | 1 | 26 | 26 | 1 | W | BL | 1 | 26 |
| 22 | 1 | A | BL | W | O | 1 | 27 | 27 | 1 | W | O | 1 | 27 |
| 23 | 1 | L | BL | G | W | 1 | 3 | 3 | 1 | G | W | 1 | 3 |
| 24 | 1 | LG | BL | W | G | 1 | 28 | 28 | 1 | W | G | 1 | 28 |
| 25 | 2 | R | BL | BR | W | 1 | 4 | 4 | 1 | BR | W | 1 | 4 |
| 26 | 2 | T | BL | W | BR | 1 | 29 | 29 | 1 | W | BR | 1 | 29 |
| 27 | 2 | A | BL | W | S | 1 | 30 | 30 | 1 | W | S | 1 | 30 |
| 28 | 2 | L | BL | BL | R | 1 | 6 | 6 | 1 | BL | R | 1 | 6 |
| 29 | 2 | LG | BL | R | BL | 1 | 31 | 31 | 1 | R | BL | 1 | 31 |
| 30 | 3 | R | BL | O | R | 1 | 7 | 7 | 1 | O | R | 1 | 7 |
| 31 | 3 | T | BL | R | O | 1 | 32 | 32 | 1 | R | O | 1 | 32 |
| 32 | 3 | A | BL | R | G | 1 | 33 | 33 | 1 | R | G | 1 | 33 |
| 33 | 3 | L | BL | BR | R | 1 | 9 | 9 | 1 | BR | R | 1 | 9 |
| 34 | 3 | LG | BL | R | BR | 1 | 34 | 34 | 1 | R | BR | 1 | 34 |
| 35 | 4 | R | BL | S | R | 1 | 10 | 10 | 1 | S | R | 1 | 10 |
| 36 | 4 | T | BL | R | S | 1 | 35 | 35 | 1 | R | S | 1 | 35 |
| 37 | 4 | A | BL | BK | BL | 1 | 36 | 36 | 1 | BK | BL | 1 | 36 |
| 38 | 4 | L | BL | O | BK | 1 | 12 | 12 | 1 | O | BK | 1 | 12 |
| 39 | 4 | LG | BL | BK | O | 1 | 37 | 37 | 1 | BK | O | 1 | 37 |
| 40 | 5 | R | BL | G | BK | 1 | 13 | 13 | 1 | G | BK | 1 | 13 |
| 41 | 5 | T | BL | BK | G | 1 | 38 | 38 | 1 | BK | G | 1 | 38 |
| 42 | 5 | A | BL | BK | BR | 1 | 39 | 39 | 1 | BK | BR | 1 | 39 |
| 43 | 5 | L | BL | S | BK | 1 | 15 | 15 | 1 | S | BK | 1 | 15 |
| 44 | 5 | LG | BL | BK | S | 1 | 40 | 40 | 1 | BK | S | 1 | 40 |
| 45 | 6 | R | BL | BL | Y | 1 | 16 | 16 | 1 | BL | Y | 2 | 1 |
| 46 | 6 | T | BL | Y | BL | 1 | 41 | 41 | 1 | Y | BL | 2 | 26 |
| 47 | 6 | A | BL | BR | BK | 1 | 14 | 14 | 1 | BR | BK | 2 | 27 |
| 48 | 6 | L | BL | G | Y | 1 | 18 | 18 | 1 | G | Y | 2 | 3 |
| 49 | 6 | LG | BL | Y | G | 1 | 43 | 43 | 1 | Y | G | 2 | 28 |
| 50 | 7 | R | BL | BR | Y | 1 | 19 | 19 | 1 | BR | Y | 2 | 4 |
| 51 | 7 | T | BL | Y | BR | 1 | 44 | 44 | 1 | Y | BR | 2 | 29 |
| 52 | 7 | A | BL | BL | BK | 1 | 11 | 11 | 1 | BL | BK | 2 | 30 |
| 53 | 7 | L | BL | BL | V | 1 | 21 | 21 | 1 | BL | V | 2 | 6 |
| 54 | 7 | LG | BL | V | BL | 1 | 46 | 46 | 1 | V | BL | 2 | 31 |
| 55 | 8 | K | BL | O | V | 1 | 22 | 22 | 1 | O | V | 2 | 7 |
| 56 | 8 | T | BL | V | O | 1 | 47 | 47 | 1 | V | O | 2 | 32 |
| 57 | 8 | A | BL | G | R | 1 | 8 | 8 | 1 | G | R | 2 | 33 |
| 58 | 8 | L | BL | BR | V | 1 | 24 | 24 | 1 | BR | V | 2 | 9 |
| 59 | 8 | LG | BL | V | BR | 1 | 49 | 49 | 1 | V | BR | 2 | 34 |
| 60 | 9 | R | BL | S | V | 1 | 25 | 25 | 1 | S | V | 2 | 10 |
| 61 | 9 | T | BL | V | S | 1 | 50 | 50 | 1 | V | S | 2 | 35 |
| 62 | 9 | A | BL | S | W | 1 | 5 | 5 | 1 | S | W | 2 | 36 |
| 63 | 9 | L | BL | G | V | 1 | 23 | 23 | 1 | G | V | 2 | 12 |
| 64 | 9 | LG | BL | V | G | 1 | 48 | 48 | 1 | V | G | 2 | 37 |
| 65 | | A1 | BL | O | W | 1 | 2 | 2 | 1 | O | W | 1 | 2 |
| 66 | | spare | BL | O | Y | 1 | 17 | 17 | 1 | O | Y | 1 | 17 |
| 67 | | spare | BL | Y | O | 1 | 42 | 42 | 1 | Y | O | 1 | 42 |
| 68 | | R | BL | S | Y | 1 | 20 | 20 | 1 | S | Y | 1 | 20 |
| 69 | | B | BL | Y | S | 1 | 45 | 45 | 1 | Y | S | 1 | 45 |
| 70 | 10 | R | O | BL | W | 2 | 1 | 1 | 2 | BL | W | 2 | 13 |
| 71 | 10 | T | O | W | BL | 2 | 26 | 26 | 2 | W | BL | 2 | 38 |
| 72 | 10 | A | O | W | O | 2 | 27 | 27 | 2 | W | O | 2 | 39 |
| 73 | 10 | L | O | G | W | 2 | 3 | 3 | 2 | G | W | 2 | 15 |
| 74 | 10 | LG | O | W | G | 2 | 28 | 28 | 2 | W | G | 2 | 40 |
| 75 | 11 | R | O | BR | W | 2 | 4 | 4 | 2 | BR | W | 2 | 16 |

TABLE I-continued

| | | | | | | | | | | | | | |
|---|---|---|---|---|---|---|---|---|---|---|---|---|---|
| 76 | 11 | T | O | W | BR | 2 | 29 | 29 | 2 | W | BR | 2 | 41 |
| 77 | 11 | A | O | W | S | 2 | 30 | 30 | 2 | W | S | 2 | 42 |
| 78 | 11 | L | O | BL | R | 2 | 6 | 6 | 2 | BL | R | 2 | 18 |
| 79 | 11 | LG | O | R | BL | 2 | 31 | 31 | 2 | R | BL | 2 | 43 |
| 80 | 12 | R | O | O | R | 2 | 7 | 7 | 2 | O | R | 3 | 1 |
| 81 | 12 | T | O | R | O | 2 | 32 | 32 | 2 | R | O | 3 | 26 |
| 82 | 12 | A | O | R | G | 2 | 33 | 33 | 2 | R | G | 3 | 27 |
| 83 | 12 | L | O | BR | R | 2 | 9 | 9 | 2 | BR | R | 3 | 3 |
| 84 | 12 | LG | O | R | BR | 2 | 34 | 34 | 2 | R | BR | 3 | 28 |
| 85 | 13 | R | O | S | R | 2 | 10 | 10 | 2 | S | R | 3 | 4 |
| 86 | 13 | T | O | R | S | 2 | 35 | 35 | 2 | R | S | 3 | 29 |
| 87 | 13 | A | O | BK | BL | 2 | 36 | 36 | 2 | BK | BL | 3 | 30 |
| 88 | 13 | L | O | O | BK | 2 | 12 | 12 | 2 | O | BK | 3 | 6 |
| 89 | 13 | LG | O | BK | O | 2 | 37 | 37 | 2 | BK | O | 3 | 31 |
| 90 | 14 | R | O | G | BK | 2 | 13 | 13 | 2 | G | BK | 3 | 7 |
| 91 | 14 | T | O | BK | G | 2 | 38 | 38 | 2 | BK | G | 3 | 32 |
| 92 | 14 | A | O | BK | BR | 2 | 39 | 39 | 2 | BK | BR | 3 | 33 |
| 93 | 14 | L | O | S | BK | 2 | 15 | 15 | 2 | S | BK | 3 | 9 |
| 94 | 14 | LG | O | BK | S | 2 | 40 | 40 | 2 | BK | S | 3 | 34 |
| 95 | 15 | R | O | BL | Y | 2 | 16 | 16 | 2 | BL | Y | 3 | 10 |
| 96 | 15 | T | O | Y | BL | 2 | 41 | 41 | 2 | Y | BL | 3 | 35 |
| 97 | 15 | A | O | BR | BK | 2 | 14 | 14 | 2 | BR | BK | 3 | 36 |
| 98 | 15 | L | O | G | Y | 2 | 18 | 18 | 2 | G | Y | 3 | 12 |
| 99 | 15 | LG | O | Y | G | 2 | 43 | 43 | 2 | Y | G | 3 | 37 |
| 100 | 16 | K | O | BR | Y | 2 | 19 | 19 | 2 | BR | Y | 3 | 13 |
| 101 | 16 | T | O | Y | BR | 2 | 44 | 44 | 2 | Y | BR | 3 | 38 |
| 102 | 16 | A | O | BL | BK | 2 | 11 | 11 | 2 | BL | BK | 3 | 39 |
| 103 | 16 | L | O | BL | V | 2 | 21 | 21 | 2 | BL | V | 3 | 15 |
| 104 | 16 | LG | O | V | BL | 2 | 46 | 46 | 2 | V | BL | 3 | 40 |
| 105 | 17 | R | O | O | V | 2 | 22 | 22 | 2 | O | V | 3 | 16 |
| 106 | 17 | T | O | V | O | 2 | 47 | 47 | 2 | V | O | 3 | 41 |
| 107 | 17 | A | O | G | R | 2 | 8 | 8 | 2 | G | R | 3 | 42 |
| 108 | 17 | L | O | BR | V | 2 | 24 | 24 | 2 | BR | V | 3 | 18 |
| 109 | 17 | LG | O | V | BR | 2 | 49 | 49 | 2 | V | BR | 3 | 43 |
| 110 | 18 | R | O | S | V | 2 | 25 | 25 | 2 | S | V | 4 | 1 |
| 111 | 18 | T | O | V | S | 2 | 50 | 50 | 2 | V | S | 4 | 26 |
| 112 | 18 | A | O | S | W | 2 | 5 | 5 | 2 | S | W | 4 | 27 |
| 113 | 18 | L | O | G | V | 2 | 23 | 23 | 2 | G | V | 4 | 3 |
| 114 | 18 | LG | O | V | G | 2 | 48 | 48 | 2 | V | G | 4 | 28 |
| 115 | 19 | R | O | S | Y | 2 | 20 | 20 | 2 | S | Y | 4 | 4 |
| 116 | 19 | T | O | Y | S | 2 | 45 | 45 | 2 | Y | S | 4 | 29 |
| 117 | 19 | A | O | O | W | 2 | 2 | 2 | 2 | O | W | 4 | 30 |
| 118 | 19 | L | O | Y | O | 2 | 17 | 17 | 2 | Y | O | 4 | 6 |
| 119 | 19 | LG | O | Y | W | 2 | 42 | 42 | 2 | Y | W | 4 | 31 |
| 120 | 20 | R | G | BL | W | 3 | 1 | 1 | 3 | BL | W | 4 | 7 |
| 121 | 20 | T | G | W | BL | 3 | 26 | 26 | 3 | W | BL | 4 | 32 |
| 122 | 20 | A | G | W | O | 3 | 27 | 27 | 3 | W | O | 4 | 33 |
| 123 | 20 | L | G | G | W | 3 | 3 | 3 | 3 | G | W | 4 | 9 |
| 124 | 20 | LG | G | W | G | 3 | 28 | 28 | 3 | W | G | 4 | 34 |
| 125 | 21 | R | G | BR | W | 3 | 4 | 4 | 3 | BR | W | 4 | 10 |
| 126 | 21 | T | G | W | BR | 3 | 29 | 29 | 3 | W | BR | 4 | 35 |
| 127 | 21 | A | G | W | S | 3 | 30 | 30 | 3 | W | S | 4 | 36 |
| 128 | 21 | L | G | BL | R | 3 | 6 | 6 | 3 | BL | R | 4 | 12 |
| 129 | 21 | LG | G | R | BL | 3 | 31 | 31 | 3 | R | BL | 4 | 37 |
| 130 | 22 | R | G | O | R | 3 | 7 | 7 | 3 | O | R | 4 | 13 |
| 131 | 22 | T | G | R | O | 3 | 32 | 32 | 3 | R | O | 4 | 38 |
| 132 | 22 | A | G | R | G | 3 | 33 | 33 | 3 | R | G | 4 | 39 |
| 133 | 22 | L | G | BR | R | 3 | 9 | 9 | 3 | BR | R | 4 | 15 |
| 134 | 22 | LG | G | R | BR | 3 | 34 | 34 | 3 | R | BR | 4 | 40 |
| 135 | 23 | R | G | S | R | 3 | 10 | 10 | 3 | S | R | 4 | 16 |
| 136 | 23 | T | G | R | S | 3 | 35 | 35 | 3 | R | S | 4 | 41 |
| 137 | 23 | A | G | BK | BL | 3 | 36 | 36 | 3 | BK | BL | 4 | 42 |
| 138 | 23 | L | G | O | BK | 3 | 12 | 12 | 3 | O | BK | 4 | 18 |
| 139 | 23 | LG | G | BK | O | 3 | 37 | 37 | 3 | BK | O | 4 | 43 |
| 140 | 24 | R | G | G | BK | 3 | 13 | 13 | 3 | G | BK | 5 | 1 |
| 141 | 24 | T | G | BK | G | 3 | 38 | 38 | 3 | BK | G | 5 | 26 |
| 142 | 24 | A | G | BK | BR | 3 | 39 | 39 | 3 | BK | BR | 5 | 27 |
| 143 | 24 | L | G | S | BK | 3 | 15 | 15 | 3 | S | BK | 5 | 3 |
| 144 | 24 | LG | G | BK | S | 3 | 40 | 40 | 3 | BK | S | 5 | 28 |
| 145 | 25 | R | G | BL | Y | 3 | 16 | 16 | 3 | BL | Y | 5 | 4 |
| 146 | 25 | T | G | Y | BL | 3 | 41 | 41 | 3 | Y | BL | 5 | 29 |
| 147 | 25 | A | G | BR | BK | 3 | 14 | 14 | 3 | BR | BK | 5 | 30 |
| 148 | 25 | L | G | G | Y | 3 | 18 | 18 | 3 | G | Y | 5 | 6 |
| 149 | 25 | LG | G | Y | G | 3 | 43 | 43 | 3 | Y | G | 5 | 31 |
| 150 | 26 | R | G | BR | Y | 3 | 19 | 19 | 3 | BR | Y | 5 | 7 |
| 151 | 26 | T | G | Y | BR | 3 | 44 | 44 | 3 | Y | BR | 5 | 32 |
| 152 | 26 | A | G | BL | BK | 3 | 11 | 11 | 3 | BL | BK | 5 | 33 |
| 153 | 26 | L | G | BL | V | 3 | 21 | 21 | 3 | BL | V | 5 | 9 |
| 154 | 26 | LG | G | V | BL | 3 | 46 | 46 | 3 | V | BL | 5 | 34 |
| 155 | 27 | R | G | O | V | 3 | 22 | 22 | 3 | O | V | 5 | 10 |
| 156 | 27 | T | G | V | O | 3 | 47 | 47 | 3 | V | O | 5 | 35 |
| 157 | 27 | A | G | G | R | 3 | 8 | 8 | 3 | G | R | 5 | 36 |
| 158 | 27 | L | G | BR | V | 3 | 24 | 24 | 3 | BR | V | 5 | 12 |
| 159 | 27 | LG | G | V | BR | 3 | 49 | 49 | 3 | V | BR | 5 | 37 |
| 160 | 28 | R | G | S | V | 3 | 25 | 25 | 3 | S | V | 5 | 13 |
| 161 | 28 | T | G | V | S | 3 | 50 | 50 | 3 | V | S | 5 | 38 |
| 162 | 28 | A | G | S | W | 3 | 5 | 5 | 3 | S | W | 5 | 39 |
| 163 | 28 | L | G | G | V | 3 | 23 | 23 | 3 | G | V | 5 | 15 |
| 164 | 28 | LG | G | V | G | 3 | 48 | 48 | 3 | V | G | 5 | 40 |
| 165 | 29 | R | G | A | Y | 3 | 20 | 20 | 3 | S | Y | 5 | 16 |
| 166 | 29 | T | G | Y | S | 3 | 45 | 45 | 3 | Y | S | 5 | 41 |
| 167 | 29 | A | G | O | W | 3 | 2 | 2 | 3 | O | W | 5 | 42 |
| 168 | 29 | L | G | O | Y | 3 | 17 | 17 | 3 | O | Y | 5 | 18 |

TABLE I-continued

| 169 | 29 | LG | G | Y | O | 3 | 42 | 42 | 3 | Y | O | 5 | 43 |

| RELAY EQUIP. | | | 30-BUTTON TELEPHONE SET | | | | | | | |
|---|---|---|---|---|---|---|---|---|---|---|
| | | | Mounting Cord | | | | | Designation | | |
| Ref. No. of Wire | Line | Lead Designation | Pin No. | Plug No. | Wire Color | Tracer Color | Binder Color | Lead Designation | Module | Button |
| 20 | 1 | R | 1 | 1 | BL | W | BL | R | 1 | 1 |
| 21 | 1 | T | 26 | 1 | W | BL | BL | T | 1 | 1 |
| 22 | 1 | A | 27 | 1 | W | O | BL | A | 1 | 1 |
| 23 | 1 | L | 3 | 1 | G | W | BL | L | 1 | 1 |
| 24 | 1 | LG | 28 | 1 | W | G | BL | LG | 1 | 1 |
| 25 | 2 | R | 4 | 1 | BR | W | BL | R | 1 | 2 |
| 26 | 2 | T | 29 | 1 | W | BR | BL | T | 1 | 2 |
| 27 | 2 | A | 30 | 1 | W | S | BL | A | 1 | 2 |
| 28 | 2 | L | 6 | 1 | BL | R | BL | L | 1 | 2 |
| 29 | 2 | LG | 31 | 1 | R | BL | BL | LG | 1 | 2 |
| 30 | 3 | R | 7 | 1 | O | R | BL | R | 1 | 3 |
| 31 | 3 | T | 32 | 1 | R | O | BL | T | 1 | 3 |
| 32 | 3 | A | 33 | 1 | R | G | BL | A | 1 | 3 |
| 33 | 3 | L | 9 | 1 | BR | R | BL | L | 1 | 3 |
| 34 | 3 LG | 34 | 1 | R | BR | BL | LG | | 3 | |
| 35 | 4 | R | 10 | 1 | S | R | BL | R | 1 | 4 |
| 36 | 4 | T | 35 | 1 | R | S | BL | T | 1 | 4 |
| 37 | 4 | A | 36 | 1 | BK | BL | BL | A | 1 | 4 |
| 38 | 4 | L | 12 | 1 | O | BK | BL | L | 1 | 4 |
| 39 | 4 | LG | 37 | 1 | BK | O | BL | LG | 1 | 4 |
| 40 | 5 | R | 13 | 1 | G | BK | BL | R | 1 | 5 |
| 41 | 5 | T | 38 | 1 | BK | G | BL | T | 1 | 5 |
| 42 | 5 | A | 39 | 1 | BK | BR | BL | A | 1 | 5 |
| 43 | 5 | L | 15 | 1 | S | BK | BL | L | 1 | 5 |
| 44 | 5 | LG | 40 | 1 | BK | S | BL | LG | 1 | 5 |
| 45 | 6 | R | 1 | 2 | BL | W | O | R | 2 | 1 |
| 46 | 6 | T | 26 | 2 | W | BL | O | T | 2 | 1 |
| 47 | 6 | A | 27 | 2 | W | O | O | A | 2 | 1 |
| 48 | 6 | L | 3 | 2 | G | W | O | L | 2 | 1 |
| 49 | 6 | LG | 28 | 2 | W | G | O | LG | 2 | 1 |
| 50 | 7 | R | 4 | 2 | BR | W | O | R | 2 | 2 |
| 51 | 7 | T | 29 | 2 | W | BR | O | T | 2 | 2 |
| 52 | 7 | A | 30 | 2 | W | S | O | A | 2 | 2 |
| 53 | 7 | L | 6 | 2 | BL | R | O | L | 2 | 2 |
| 54 | 7 | LG | 31 | 2 | R | BL | O | LG | 2 | 2 |
| 55 | 8 | K | 7 | 2 | O | R | O | R | 2 | 3 |
| 56 | 8 | T | 32 | 2 | R | O | O | T | 2 | 3 |
| 57 | 8 | A | 33 | 2 | R | L | O | A | 2 | 3 |
| 58 | 8 | L | 9 | 2 | BR | R | O | L | 2 | 3 |
| 59 | 8 | LG | 34 | 2 | R | BR | O | LG | 2 | 3 |
| 60 | 9 | R | 10 | 2 | S | R | O | R | 2 | 4 |
| 61 | 9 | T | 35 | 2 | R | S | O | T | 2 | 4 |
| 62 | 9 | A | 36 | 2 | BK | BL | O | A | 2 | 4 |
| 63 | 9 | L | 12 | 2 | O | BK | O | L | 2 | 4 |
| 64 | 9 | LG | 37 | 2 | BK | O | O | LG | 2 | 4 |
| 65 | | A1 | 2 | 1 | O | W | BL | A1 | 1 | Hold |
| 66 | | spare | 17 | 1 | O | Y | BL | spare | 1 | |
| 67 | | spare | 42 | 1 Y | O | BL | spare | | 1 | |
| 68 | | R | 20 | 1 | S | Y | BL | R | 1 | Ring |
| 69 | | B | 45 | 1 | Y | S | BL | B | 1 | Ring |
| 70 | 10 | R | 13 | 2 | G | BK | O | R | 2 | 5 |
| 71 | 10 | T | 38 | 2 | BK | G | O | T | 2 | 5 |
| 72 | 10 | A | 39 | 2 | BK | BR | O | A | 2 | 5 |
| 73 | 10 | L | 15 | 2 | S | BK | O | L | 2 | 5 |
| 74 | 10 | LG | 40 | 2 | BK | A | O | LG | 2 | 5 |
| 75 | 11 | R | 16 | 2 | BL | Y | O | R | 2 | 6 |
| 76 | 11 | T | 41 | 2 | Y | BL | O | T | 2 | 6 |
| 77 | 11 | A | 42 | 2 | Y | O | O | A | 2 | 6 |
| 78 | 11 | L | 18 | 2 | G | Y | O | L | 2 | 6 |
| 79 | 11 | LG | 43 | 2 | Y | G | O | LG | 2 | 6 |
| 80 | 12 | R | 1 | 3 | BL | W | G | R | 3 | 1 |
| 81 | 12 | T | 26 | 3 | W | BL | G | T | 3 | 1 |
| 82 | 12 | A | 27 | 3 | W | O | G | A | 3 | 1 |
| 83 | 12 | L | 3 | 3 | G | W | G | L | 3 | 1 |
| 84 | 12 | LG | 28 | 3 | W | G | G | LG | 3 | 1 |
| 85 | 13 | R | 4 | 3 | BR | W | G | R | 3 | 2 |
| 86 | 13 | T | 29 | 3 | W | BR | G | T | 3 | 2 |
| 87 | 13 | A | 30 | 3 | W | S | G | A | 3 | 2 |
| 88 | 13 | L | 6 | 3 | BL | R | G | L | 3 | 2 |
| 89 | 13 | LG | 31 | 3 | R | BL | G | LG | 3 | 2 |
| 90 | 14 | R | 7 | 3 | O | R | G | R | 3 | 3 |
| 91 | 14 | T | 32 | 3 | R | O | G | T | 3 | 3 |
| 92 | 14 | A | 33 | 3 | R | G | G | A | 3 | 3 |
| 93 | 14 | L | 9 | 3 | BR | R | G | L | 3 | 3 |
| 94 | 14 | LG | 34 | 3 | R | BR | G | LG | 3 | 3 |
| 95 | 15 | R | 10 | 3 | S | R | G | R | 3 | 4 |
| 96 | 15 | T | 35 | 3 | R | S | G | T | 3 | 4 |
| 97 | 15 | A | 36 | 3 | BK | BL | G | A | 3 | 4 |
| 98 | 15 | L | 12 | 3 | O | BK | G | L | 3 | 4 |
| 99 | 15 | LG | 37 | 3 | BK | O | G | LG | 3 | 4 |
| 100 | 16 | K | 13 | 3 | G | BK | G | R | 3 | 5 |
| 101 | 16 | T | 38 | 3 | BK | G | G | T | 3 | 5 |
| 102 | 16 | A | 39 | 3 | BK | BR | G | A | 3 | 5 |
| 103 | 16 | L | 15 | 3 | S | BK | G | L | 3 | 5 |
| 104 | 16 | LG | 40 | 3 | BK | S | G | LG | 3 | 5 |

TABLE I-continued

| | | | | | | | | | | |
|---|---|---|---|---|---|---|---|---|---|---|
| 105 | 17 | R | 16 | 3 | BL | Y | G | R | 3 | 6 |
| 106 | 17 | T | 41 | 3 | Y | BL | G | T | 3 | 6 |
| 107 | 17 | A | 42 | 3 | Y | O | G | A | 3 | 6 |
| 108 | 17 | L | 18 | 3 | G | Y | G | L | 3 | 6 |
| 109 | 17 | LG | 43 | 3 | Y | G | G | LG | 3 | 6 |
| 110 | 18 | R | 1 | 4 | BL | W | BR | R | 4 | 1 |
| 111 | 18 | T | 26 | 4 | W | BL | BR | T | 4 | 1 |
| 112 | 18 | A | 27 | 4 | W | O | BR | A | 4 | 1 |
| 113 | 18 | L | 3 | 4 | G | W | BR | L | 4 | 1 |
| 114 | 18 | LG | 28 | 4 | W | G | BR | LG | 4 | 1 |
| 115 | 19 | R | 4 | 4 | BR | W | BR | R | 4 | 2 |
| 116 | 19 | T | 29 | 4 | W | BR | BR | T | 4 | 2 |
| 117 | 19 | A | 30 | 4 | W | S | BR | A | 4 | 2 |
| 118 | 19 | L | 6 | 4 | BL | R | BR | L | 4 | 2 |
| 119 | 19 | LG | 31 | 4 | R | BL | BR | LG | 4 | 2 |
| 120 | 20 | R | 7 | 4 | O | R | BR | R | 4 | 3 |
| 121 | 20 | T | 32 | 4 | R | O | BR | T | 4 | 3 |
| 122 | 20 | A | 33 | 4 | R | G | BR | A | 4 | 3 |
| 123 | 20 | L | 9 | 4 | BR | R | BR | L | 4 | 3 |
| 124 | 20 | LG | 34 | 4 | R | BR | BR | LG | 4 | 3 |
| 125 | 21 | R | 10 | 4 | S | R | BR | R | 4 | 4 |
| 126 | 21 | T | 35 | 4 | R | S | BR | T | 4 | 4 |
| 127 | 21 | A | 36 | 4 | BK | BL | BR | A | 4 | 4 |
| 128 | 21 | L | 12 | 4 | O | BK | BR | L | 4 | 4 |
| 129 | 21 | LG | 37 | 4 | BK | O | BR | LG | 4 | 4 |
| 130 | 22 | R | 13 | 4 | G | BK | BR | R | 4 | 5 |
| 131 | 22 | T | 38 | 4 | BK | G | BR | T | 4 | 5 |
| 132 | 22 | A | 39 | 4 | BK | BR | BR | A | 4 | 5 |
| 133 | 22 | L | 15 | 4 | S | BK | BR | L | 4 | 5 |
| 134 | 22 | LG | 40 | 4 | BK | S | BR | LG | 4 | 5 |
| 135 | 23 | R | 16 | 4 | BL | Y | BR | R | 4 | 6 |
| 136 | 23 | T | 41 | 4 | Y | BL | BR | T | 4 | 6 |
| 137 | 23 | A | 42 | 4 | Y | O | BR | A | 4 | 6 |
| 138 | 23 | L | 18 | 4 | G | Y | BR | L | 4 | 6 |
| 139 | 23 | LG | 43 | 4 | Y | G | BR | LG | 4 | 6 |
| 140 | 24 | R | 1 | 5 | BL | W | S | R | 5 | 1 |
| 141 | 24 | T | 26 | 5 | W | BL | S | T | 5 | 1 |
| 142 | 24 | A | 27 | 5 | W | O | S | A | 5 | 1 |
| 143 | 24 | L | 3 | 5 | G | W | S | L | 5 | 1 |
| 144 | 24 | LG | 28 | 5 | W | G | S | LG | 5 | 1 |
| 145 | 25 | R | 4 | 5 | BR | W | S | R | 5 | 2 |
| 146 | 25 | T | 29 | 5 | W | BR | S | T | 5 | 2 |
| 147 | 25 | A | 30 | 5 | W | S | S | A | 5 | 2 |
| 148 | 25 | L | 6 | 5 | BL | R | S | L | 5 | 2 |
| 149 | 25 | LG | 31 | 5 | R | BL | S | LG | 5 | 2 |
| 150 | 26 | R | 7 | 5 | O | R | S | R | 5 | 3 |
| 151 | 26 | T | 32 | 5 | R | O | S | T | 5 | 3 |
| 152 | 26 | A | 33 | 5 | R | G | S | A | 5 | 3 |
| 153 | 26 | L | 9 | 5 | BR | R | S | L | 5 | 3 |
| 154 | 26 | LG | 34 | 5 | R | BR | S | LG | 5 | 3 |
| 155 | 27 | R | 10 | 5 | S | R | S | R | 5 | 4 |
| 156 | 27 | T | 35 | 5 | R | S | S | T | 5 | 4 |
| 157 | 27 | A | 36 | 5 | BK | BL | S | A | 5 | 4 |
| 158 | 27 | L | 12 | 5 | O | BK | S | L | 5 | 4 |
| 159 | 27 | LG | 37 | 5 | BK | O | S | LG | 5 | 4 |
| 160 | 28 | R | 13 | 5 | G | BK | S | R | 5 | 5 |
| 161 | 28 | T | 38 | 5 | BK | G | S | T | 5 | 5 |
| 162 | 28 | A | 39 | 5 | BK | BR | S | A | 5 | 5 |
| 163 | 28 | L | 15 | 5 | S | BK | S | L | 5 | 5 |
| 164 | 28 | LG | 40 | 5 | BK | S | S | LG | 5 | 5 |
| 165 | 29 | R | 16 | 5 | BL | Y | S | R | 5 | 6 |
| 166 | 29 | T | 41 | 5 | Y | BL | S | T | 5 | 6 |
| 167 | 29 | A | 42 | 5 | Y | O | S | A | 5 | 6 |
| 168 | 29 | L | 18 | 5 | G | Y | S | L | 5 | 6 |
| 169 | 29 | LG | 43 | 5 | Y | G | S | LG | 5 | 6 |

From Table I, it is seen that a 30-button Call-Director™ telephone set requires a total of 148 conductors to be completely operational, but these 148 conductors are arranged in a cord in five groups and equipped with five male plugs. On the other hand, the 75 pair telephone cable has 150 conductors arranged in three groups and equipped with three connectors. By utilizing an adapter of the present invention, the conductors from the telephone cable are directed to the proper positions in the five plugs of the telephone cord and translated to the color code of the conductors of the telephone cord. The 75 pair telephone cable accordingly can be utilized to operate the 30-button Call-Director™ telephone set.

While the presently preferred embodiments of the invention have been shown and described with particularity, it is distinctly understood that the invention may be otherwise variously embodied and used within the scope of the following claims.

What is claimed is:

1. A telephone cable adapter comprising:
   A. a plurality of male plugs, each plug having a plurality of pairs of pins adapted for connection to pairs of female sockets of a corresponding connector of a telephone cable;
   B. a plurality of female connectors different in number from the male plugs, each connector having a plurality of pairs of sockets adapted for connection to pairs of pins of a corresponding plug of a telephone set;
   C. a plurality of conductors for electrical connection of pins of the male plugs with sockets of the female connectors in a one to one correspondence such that pins of at least one male plug electrically connect to sockets of more than one female connector to direct and translate conductors of the telephone cable to the plugs and color code of the telephone set.

2. A telephone cable adapter as set forth in claim 1 wherein:
three male plugs and five female connectors are provided.

3. A telephone cable adapter as set forth in claim 1 wherein:
each male plug has 25 pairs of pins; and
each female connector has 25 pairs of sockets.

4. A telephone cable adapter as claimed in claim 3 wherein:
three male plugs and five female connectors are provided.

* * * * *